United States Patent [19]

Bill et al.

[11] 4,207,024
[45] Jun. 10, 1980

[54] COMPOSITE SEAL FOR TURBOMACHINERY

[75] Inventors: Robert C. Bill, Hocky River; Lawrence P. Ludwig, Fairview Park, both of Ohio

[73] Assignee: The United States of America as represented by the Administrator of the National Aeronautics and Space Administration, Washington, D.C.

[21] Appl. No.: 931,090

[22] Filed: Aug. 4, 1978

Related U.S. Application Data

[62] Division of Ser. No. 801,290, May 27, 1977, Pat. No. 4,135,851.

[51] Int. Cl.² .............................................. F01D 11/08
[52] U.S. Cl. ...................................... 415/174; 415/196
[58] Field of Search ............... 415/174, 200, 208, 217, 415/218, 214, 197, 196; 277/96, 96.1, 96.2, 236; 29/404; 428/462, 492

[56] References Cited

U.S. PATENT DOCUMENTS

| 2,952,442 | 9/1960 | Warnken | 415/174 UX |
|---|---|---|---|
| 3,423,070 | 1/1969 | Corrigan | 415/200 |
| 3,519,282 | 7/1970 | Davis | 277/236 X |
| 3,545,944 | 12/1970 | Emanuelson et al. | 415/174 UX |
| 3,880,550 | 4/1975 | Corey et al. | 415/174 |
| 3,887,299 | 6/1975 | Profant | 415/174 |
| 4,022,481 | 5/1977 | Long et al. | 415/174 |
| 4,063,742 | 12/1977 | Watkins, Jr. | 415/174 X |
| 4,135,851 | 1/1979 | Bill et al. | 415/174 |
| 4,139,376 | 2/1979 | Erickson et al. | 415/174 X |

FOREIGN PATENT DOCUMENTS

| 660610 | 4/1963 | Canada | 277/96 |
|---|---|---|---|
| 1576942 | 7/1970 | Fed. Rep. of Germany | 418/153 |

*Primary Examiner*—Everette A. Powell, Jr.
*Attorney, Agent, or Firm*—Musial, N. T.; J. R. Manning; G. E. Shook

[57] ABSTRACT

A gas path seal suitable for use with a turbine engine or compressor is provided. A shroud wearable or abradable by the abrasion of the rotor blades of the turbine or compressor shrouds the rotor blades. A compliant backing surrounds the shroud. The backing is a compliant material covered with a thin ductile layer. A mounting fixture surrounds the backing.

6 Claims, 1 Drawing Figure

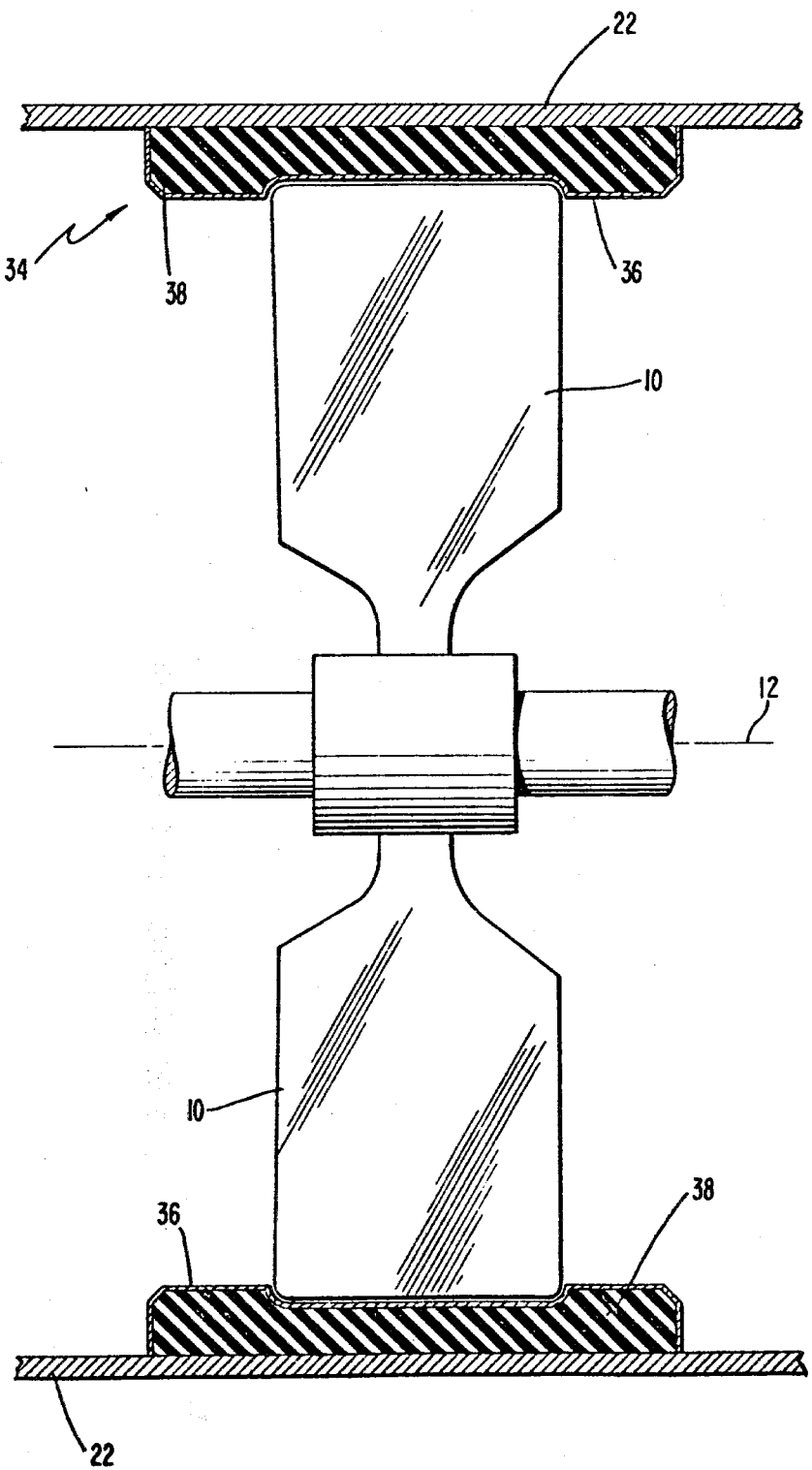

COMPOSITE SEAL FOR TURBOMACHINERY

ORIGIN OF THE INVENTION

The invention described herein was made by employees of the U.S. Government and may be manufactured and used by or for the Government for governmental purposes without the payment of any royalties thereon or therefor.

RELATED APPLICATION

This application is a division of copending application Ser. No. 801,290 which was filed May 27, 1977 and is now U.S. Pat. No. 4,135,851.

BACKGROUND OF THE INVENTION

In the design of turbines or compressors or the like, especially those of high speed, it is understood that close tolerance between the tips of the blades and the surrounding shroud or housing which seals one side of the blades from the other is desirable. Such a seal reduces the return flow of fluid from the high pressure to the low pessure side. The closer the shroud surrounds the tips of the blades, the more efficient is the turbine or compressor. Aerodynamic losses are also reduced by closer fitting of the blade tips to the shroud.

Nevertheless the clearance dimensions are dynamic. They increase and decrease with temperature and with mechanical and aerodynamic forces and may increase or decrease faster than the rotor. The clearance may also decrease, for example in one direction, under so-called shock loading when an airplane makes a sudden maneuver that subjects the parts to unusual acceleration forces, causing a differential expansion or movement of the parts.

The prior attack on such problems has been to design the shroud to fit closely, say within 20 to 30 mils. (i.e. about 5 to 7 mm.) about the tips of the blades at ambient temperature. Moreover, the shroud about the blade has been designed to be wearable or abradable relative to the blade tips. Then if there is a thermal transient or shock loading that causes a blade tip to strike the shroud, the blade material flakes off or abrades the shroud material, which may be a sprayed coating or sintered material of low density. Thus the shroud material is abradable (or wearable) with respect to the blade material. However, such wear is not readily achieved in practice. By the arrangement of the present invention the blade tip may be designed to rotate in close proximity to the shroud without fear of cataclysmic destruction of either blade or shroud, should contact between the two occur due to thermal transient or shock loading.

SUMMARY OF THE INVENTION

According to the present invention, there is provided a combination for a turbine rotor or the like a stator shroud of material wearable relative to the blades, a compliant backing with a thin ductile layer, and a rigid mounting surrounding the compliant backing. The compliance of the backing tends to cause the shroud when tipped or touched by the rotating blade because of some transient condition to yield somewhat. Then, even though abraded or worn, the compliance of the backing provides a restorative force tending to return the shroud at its worn portion toward its original dimension. In the preferred embodiment wherein the compliant backing has a ductile top coating, the normal forces are limited and the blade wear is reduced. Hence any gap is less than in prior instance of such wear, and the useful life of the shroud is increased.

BRIEF DESCRIPTION OF THE DRAWING

The objects, advantages and novel features of the invention will be more fully apparent from the following detailed description when read in connection with the accompanying drawing which is a schematic view, in longitudinal cross section, of a preferred embodiment of the invention.

DESCRIPTION OF THE PREFERRED EMBODIMENT

Referring to the FIGURE, a rotor blade 10 of a turbine compressor, for example, rotates about an axis 12 tending to force the fluid in which it operates along this axis. A shroud surrounds the blade 10 and is substantially concentric with the axis 12. The shroud may be of suitable material abradable relative to the material of the blade 10.

A compliant backing surrounds the shroud. The abradable shroud is bonded to the concave, inner face of the backing. The backing is inserted and bound to a housing 22.

Previous abradable seals, even though various materials for the shroud have been proposed, such as sintered metals, metal honeycombs, and porous ceramics, have not provided a desirable flexibility. After abrasion due to a transient condition such as a thermal transient or shock loading, the gap or wear produced by the rub or contact is generally larger than the interference depth because of tearing out, galling, and spalling.

The drawing illustrates the preferred embodiment in which the blade 10 is shown at an instant when forces have caused the tip of the blade to contact the shroud. The compliant backing in this case is slightly compressed, the compression as illustrated in the drawing in exaggerated fashion.

The material of the shroud 34 may be a relatively thin layer 36 of deformable metallic material. The backing 38 is a compliant material, such as a porous rubber or rubber-like material, for example, sponge rubber, low density sintered metal, or gas blown plastic. The metal or metal alloy layer 36 may be a dense plasma sprayed soft metal, such as aluminum, or a bonded metal sheet or foil.

When the blades, as a result of forces such as described hereinbefore, rub against the shroud, the thin metallic layer 36 is deformed into the compliant substrate material 38. In effect because of the compliant substrate material 38 the magnitude of a force normal to the surface of the shroud is limited. This normal force is measured in the radially inward direction from the shroud. A larger displacement simply causes a greater deformation without greatly increasing the normal force. Therefore, in effect, the compliant substrate material limits the magnitude of the normal force which can be developed between the blade tip and the shroud. The more porous and yieldingly deformable the substrate 38 and the thinner the shroud layer 36, the smaller will be the normal force. Because the normal force is low when the blades rub against the shroud, blade wear is reduced.

Currently used shroud materials such as sintered metal or felt metals have disadvantages of low erosion resistance, aerodynamic roughness and porosity which permit back leakage. An arrangement as described in connection with the drawing with the shroud layer as suggested herein provides an aerodynamically smooth surface and high erosion resistance and is substantially less permeable from a leakage standpoint. Furthermore, any wear debris produced in the rub is less than that produced in other shroud arrangements. Wear debris tends to plug up turbine cooling holes and to plate out or stick on compressor blades causing aerodynamic losses.

Various modifications may be made. For example, metallic sheets (not illustrated) may be distorted by wires aligned parallel to axis 12 to form corrugations for the compliant backing, or these corrugations might extend at angles of less than 90° to the axial direction. Instead of sponge rubber in the compliant backing 38 we may use fibermetal and instead of the thin metallic layer, material such as high temperature resistant ceramic layer may be used.

What is claimed is:

1. A gas path seal for a turbine or the like having a plurality of blades mounted for rotation about an axis comprising a stator shroud having an aerodynamically smooth surface on a thin layer of a deformable metallic material that is wearable relative to said blades and closely spaced to the blade tips whereby said shroud is deformed when said blades rub against said surface, a yieldingly deformable rubber backing surrounding said layer to receive said deformed shroud thereby reducing said blade wear by limiting the magnitude of normal forces measured radially inward which are developed between the blade tips and the shroud, and a rigid mounting housing surrounding said backing and being secured to the outermost surface of said backing.

2. The combination as claimed in claim 1, said shroud being substantially cylindrical.

3. The combination as claimed in claim 2, said mounting housing being also cylindrical.

4. A gas path seal as claimed in claim 1, said thin layer of stator shroud material comprising flexible sheet metal.

5. A gas path seal as claimed in claim 1, said thin layer of stator shroud material comprising foil.

6. A combination as claimed in claim 5, said thin layer of stator shroud material comprising aluminum foil.

* * * * *